(12) United States Patent
Lunde

(10) Patent No.: US 8,296,301 B2
(45) Date of Patent: Oct. 23, 2012

(54) SYSTEMS AND METHODS FOR PROBABILISTIC DATA CLASSIFICATION

(75) Inventor: Norman R. Lunde, Middletown, NJ (US)

(73) Assignee: CommVault Systems, Inc., Oceanport, NJ (US)

(*) Notice: Subject to any disclaimer, the term of this patent is extended or adjusted under 35 U.S.C. 154(b) by 717 days.

(21) Appl. No.: 12/022,676

(22) Filed: Jan. 30, 2008

(65) Prior Publication Data

US 2009/0192979 A1 Jul. 30, 2009

(51) Int. Cl.
G06F 17/30 (2006.01)
G06F 7/00 (2006.01)

(52) U.S. Cl. ........................................................ 707/738
(58) Field of Classification Search .................. 707/738, 707/999.001
See application file for complete search history.

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |

(Continued)

FOREIGN PATENT DOCUMENTS

EP 0259912 3/1988

(Continued)

OTHER PUBLICATIONS

U.S. Appl. No. 11/563,940, filed Nov. 28, 2006, Prahlad et al.

(Continued)

*Primary Examiner* — Kimberly Wilson
(74) *Attorney, Agent, or Firm* — Knobbe Martens Olson & Bear LLP

(57) ABSTRACT

A system for performing data classification operations. In one embodiment, the system comprises a filesystem configured to store a plurality of computer files and a scanning agent configured to traverse the filesystem and compile data regarding the attributes and content of the plurality of computer files. The system also comprises an index configured to store the data regarding attributes and content of the plurality of computer files and a file classifier configured to analyze the data regarding the attributes and content of the plurality of computer files and to classify the plurality of computer files into one or more categories based on the data regarding the attributes and content of the plurality of computer files. Results of the file classification operations can be used to set appropriate security permissions on files which include sensitive information or to control the way that a file is backed up or the schedule according to which it is archived.

23 Claims, 3 Drawing Sheets

U.S. PATENT DOCUMENTS

| | | | |
|---|---|---|---|
| 5,495,607 A | 2/1996 | Pisello et al. | |
| 5,504,873 A | 4/1996 | Martin et al. | |
| 5,519,865 A | 5/1996 | Kondo et al. | |
| 5,544,345 A | 8/1996 | Carpenter et al. | |
| 5,544,347 A | 8/1996 | Yanai et al. | |
| 5,559,957 A | 9/1996 | Balk | |
| 5,619,644 A | 4/1997 | Crockett et al. | |
| 5,638,509 A | 6/1997 | Dunphy et al. | |
| 5,673,381 A | 9/1997 | Huai et al. | |
| 5,699,361 A | 12/1997 | Ding et al. | |
| 5,729,743 A | 3/1998 | Squibb | |
| 5,737,747 A | 4/1998 | Vishlitzky et al. | |
| 5,751,997 A | 5/1998 | Kullick et al. | |
| 5,758,359 A | 5/1998 | Saxon | |
| 5,761,677 A | 6/1998 | Senator et al. | |
| 5,764,972 A | 6/1998 | Crouse et al. | |
| 5,778,395 A | 7/1998 | Whiting et al. | |
| 5,812,398 A | 9/1998 | Nielsen | |
| 5,813,009 A | 9/1998 | Johnson et al. | |
| 5,813,017 A | 9/1998 | Morris | |
| 5,829,046 A | 10/1998 | Tzelnic et al. | |
| 5,832,510 A | 11/1998 | Ito et al. | |
| 5,875,478 A | 2/1999 | Blumenau | |
| 5,887,134 A | 3/1999 | Ebrahim | |
| 5,892,917 A | 4/1999 | Myerson | |
| 5,901,327 A | 5/1999 | Ofek | |
| 5,907,621 A | 5/1999 | Bachman et al. | |
| 5,924,102 A | 7/1999 | Perks | |
| 5,950,205 A | 9/1999 | Aviani, Jr. | |
| 5,953,721 A | 9/1999 | Doi et al. | |
| 5,974,563 A | 10/1999 | Beeler, Jr. | |
| 6,021,415 A | 2/2000 | Cannon et al. | |
| 6,026,414 A | 2/2000 | Anglin | |
| 6,052,735 A | 4/2000 | Ulrich et al. | |
| 6,061,692 A | 5/2000 | Thomas et al. | |
| 6,076,148 A | 6/2000 | Kedem et al. | |
| 6,094,416 A | 7/2000 | Ying | |
| 6,131,095 A | 10/2000 | Low et al. | |
| 6,131,190 A | 10/2000 | Sidwell | |
| 6,148,412 A | 11/2000 | Cannon et al. | |
| 6,154,787 A | 11/2000 | Urevig et al. | |
| 6,154,852 A | 11/2000 | Amundson et al. | |
| 6,161,111 A | 12/2000 | Mutalik et al. | |
| 6,167,402 A | 12/2000 | Yeager | |
| 6,175,829 B1 | 1/2001 | Li et al. | |
| 6,212,512 B1 | 4/2001 | Barney et al. | |
| 6,240,416 B1 | 5/2001 | Immon et al. | |
| 6,260,069 B1 | 7/2001 | Anglin | |
| 6,269,431 B1 | 7/2001 | Dunham | |
| 6,275,953 B1 | 8/2001 | Vahalia et al. | |
| 6,301,592 B1 | 10/2001 | Aoyama et al. | |
| 6,324,581 B1 | 11/2001 | Xu et al. | |
| 6,328,766 B1 | 12/2001 | Long | |
| 6,330,570 B1 | 12/2001 | Crighton et al. | |
| 6,330,642 B1 | 12/2001 | Carteau | |
| 6,343,324 B1 | 1/2002 | Hubis et al. | |
| 6,350,199 B1 | 2/2002 | Williams et al. | |
| RE37,601 E | 3/2002 | Eastridge et al. | |
| 6,356,801 B1 | 3/2002 | Goodman et al. | |
| 6,374,336 B1 | 4/2002 | Peters et al. | |
| 6,389,432 B1 | 5/2002 | Pothapragada et al. | |
| 6,418,478 B1 | 7/2002 | Ignatius et al. | |
| 6,421,683 B1 | 7/2002 | Lamburt | |
| 6,421,711 B1 | 7/2002 | Blumenau et al. | |
| 6,421,779 B1 | 7/2002 | Kuroda et al. | |
| 6,430,575 B1 | 8/2002 | Dourish et al. | |
| 6,438,586 B1 | 8/2002 | Hass et al. | |
| 6,487,561 B1 | 11/2002 | Ofek et al. | |
| 6,487,644 B1 | 11/2002 | Huebsch et al. | |
| 6,519,679 B2 | 2/2003 | Devireddy et al. | |
| 6,538,669 B1 | 3/2003 | Lagueux, Jr. et al. | |
| 6,542,909 B1 | 4/2003 | Tamer et al. | |
| 6,542,972 B2 | 4/2003 | Ignatius et al. | |
| 6,564,228 B1 | 5/2003 | O'Connor | |
| 6,581,143 B2 | 6/2003 | Gagne et al. | |
| 6,625,623 B1 | 9/2003 | Midgley et al. | |
| 6,647,396 B2 | 11/2003 | Parnell et al. | |
| 6,658,436 B2 | 12/2003 | Oshinsky et al. | |
| 6,658,526 B2 | 12/2003 | Nguyen et al. | |
| 6,732,124 B1 | 5/2004 | Koseki et al. | |
| 6,763,351 B1 | 7/2004 | Subramaniam et al. | |
| 6,775,790 B2 | 8/2004 | Reuter et al. | |
| 6,847,984 B1 | 1/2005 | Midgley et al. | |
| 6,871,163 B2 | 3/2005 | Hiller et al. | |
| 6,886,020 B1 | 4/2005 | Zahavi et al. | |
| 6,947,935 B1 | 9/2005 | Horvitz et al. | |
| 6,983,322 B1 | 1/2006 | Tripp et al. | |
| 6,996,616 B1 | 2/2006 | Leighton et al. | |
| 7,003,519 B1 | 2/2006 | Biettron et al. | |
| 7,035,880 B1 | 4/2006 | Crescenti et al. | |
| 7,103,740 B1 | 9/2006 | Colgrove et al. | |
| 7,130,970 B2 | 10/2006 | Devassy et al. | |
| 7,167,895 B1 | 1/2007 | Connelly | |
| 7,181,444 B2 | 2/2007 | Porter et al. | |
| 7,216,043 B2 | 5/2007 | Ransom et al. | |
| 7,240,100 B1 | 7/2007 | Wein et al. | |
| 7,246,207 B2 | 7/2007 | Kottomtharayil et al. | |
| 7,246,211 B1 | 7/2007 | Beloussov et al. | |
| 7,330,997 B1 | 2/2008 | Odom | |
| 7,346,623 B2 | 3/2008 | Prahlad et al. | |
| 7,346,676 B1 | 3/2008 | Swildens et al. | |
| 7,359,917 B2 | 4/2008 | Winter et al. | |
| 7,454,569 B2 | 11/2008 | Kavuri et al. | |
| 7,500,150 B2 | 3/2009 | Sharma et al. | |
| 7,529,748 B2 | 5/2009 | Wen et al. | |
| 7,533,103 B2 | 5/2009 | Brendle et al. | |
| 7,583,861 B2 | 9/2009 | Hanna et al. | |
| 7,590,997 B2 | 9/2009 | Perez | |
| 7,613,752 B2 | 11/2009 | Prahlad et al. | |
| 7,627,598 B1 | 12/2009 | Burke | |
| 7,627,617 B2 | 12/2009 | Kavuri et al. | |
| 2002/0004883 A1 | 1/2002 | Nguyen et al. | |
| 2002/0049738 A1 | 4/2002 | Epstein | |
| 2002/0069324 A1 | 6/2002 | Gerasimov et al. | |
| 2002/0083055 A1 | 6/2002 | Pachet et al. | |
| 2002/0087550 A1 | 7/2002 | Carlyle et al. | |
| 2002/0133476 A1 | 9/2002 | Reinhardt | |
| 2002/0174107 A1 | 11/2002 | Poulin | |
| 2003/0018607 A1 | 1/2003 | Lennon et al. | |
| 2003/0115219 A1 | 6/2003 | Chadwick | |
| 2003/0130993 A1* | 7/2003 | Mendelevitch et al. | 707/3 |
| 2003/0182583 A1 | 9/2003 | Turco | |
| 2004/0010487 A1 | 1/2004 | Prahlad et al. | |
| 2004/0010493 A1 | 1/2004 | Kojima et al. | |
| 2004/0015468 A1 | 1/2004 | Beier et al. | |
| 2004/0015514 A1 | 1/2004 | Melton et al. | |
| 2004/0139059 A1 | 7/2004 | Conroy et al. | |
| 2004/0254919 A1 | 12/2004 | Giuseppini | |
| 2004/0255161 A1 | 12/2004 | Cavanaugh | |
| 2004/0260678 A1 | 12/2004 | Verbowski et al. | |
| 2005/0021537 A1 | 1/2005 | Brendle et al. | |
| 2005/0033800 A1 | 2/2005 | Kavuri et al. | |
| 2005/0037367 A9 | 2/2005 | Fiekowsky et al. | |
| 2005/0044114 A1 | 2/2005 | Kottomtharayil et al. | |
| 2005/0050075 A1 | 3/2005 | Okamoto et al. | |
| 2005/0114406 A1 | 5/2005 | Borthakur et al. | |
| 2005/0154695 A1 | 7/2005 | Gonzalez et al. | |
| 2005/0182773 A1 | 8/2005 | Feinsmith | |
| 2005/0182797 A1 | 8/2005 | Adkins et al. | |
| 2005/0188248 A1 | 8/2005 | O'Brien et al. | |
| 2005/0193128 A1 | 9/2005 | Dawson et al. | |
| 2005/0203964 A1 | 9/2005 | Matsunami et al. | |
| 2005/0216453 A1 | 9/2005 | Sasaki et al. | |
| 2005/0228794 A1 | 10/2005 | Navas et al. | |
| 2005/0257083 A1 | 11/2005 | Cousins | |
| 2005/0262097 A1 | 11/2005 | Sim-Tang et al. | |
| 2005/0289193 A1 | 12/2005 | Arrouye et al. | |
| 2006/0004820 A1 | 1/2006 | Claudatos et al. | |
| 2006/0010227 A1 | 1/2006 | Atluri | |
| 2006/0031225 A1 | 2/2006 | Palmeri et al. | |
| 2006/0031263 A1 | 2/2006 | Arrouye et al. | |
| 2006/0031287 A1 | 2/2006 | Ulrich et al. | |
| 2006/0101285 A1 | 5/2006 | Chen et al. | |
| 2006/0106814 A1 | 5/2006 | Blumenau et al. | |
| 2006/0195449 A1* | 8/2006 | Hunter et al. | 707/9 |
| 2006/0224846 A1 | 10/2006 | Amarendran et al. | |
| 2006/0253495 A1 | 11/2006 | Png | |

| | | | |
|---|---|---|---|
| 2006/0259468 | A1 | 11/2006 | Brooks et al. |
| 2006/0259724 | A1* | 11/2006 | Saika .............................. 711/162 |
| 2006/0294094 | A1 | 12/2006 | King et al. |
| 2007/0027861 | A1* | 2/2007 | Huentelman et al. ............. 707/5 |
| 2007/0033191 | A1 | 2/2007 | Hornkvist et al. |
| 2007/0112809 | A1 | 5/2007 | Arrouye et al. |
| 2007/0179995 | A1 | 8/2007 | Prahlad et al. |
| 2007/0185914 | A1 | 8/2007 | Prahlad et al. |
| 2007/0185915 | A1 | 8/2007 | Prahlad et al. |
| 2007/0185916 | A1 | 8/2007 | Prahlad et al. |
| 2007/0185917 | A1 | 8/2007 | Prahlad et al. |
| 2007/0185921 | A1 | 8/2007 | Prahlad et al. |
| 2007/0185925 | A1 | 8/2007 | Prahlad et al. |
| 2007/0185926 | A1 | 8/2007 | Prahlad et al. |
| 2007/0192360 | A1 | 8/2007 | Prahlad et al. |
| 2007/0192385 | A1 | 8/2007 | Prahlad et al. |
| 2007/0198570 | A1 | 8/2007 | Prahlad et al. |
| 2007/0198593 | A1 | 8/2007 | Prahlad et al. |
| 2007/0198601 | A1 | 8/2007 | Prahlad et al. |
| 2007/0198608 | A1 | 8/2007 | Prahlad et al. |
| 2007/0198611 | A1 | 8/2007 | Prahlad et al. |
| 2007/0198612 | A1 | 8/2007 | Prahlad et al. |
| 2007/0198613 | A1 | 8/2007 | Prahlad et al. |
| 2007/0203937 | A1 | 8/2007 | Prahlad et al. |
| 2007/0203938 | A1* | 8/2007 | Prahlad et al. ................. 707/102 |
| 2007/0288536 | A1 | 12/2007 | Sen et al. |
| 2008/0021921 | A1 | 1/2008 | Horn |
| 2008/0059515 | A1 | 3/2008 | Fulton |
| 2008/0091655 | A1 | 4/2008 | Gokhale et al. |
| 2008/0228771 | A1 | 9/2008 | Prahlad et al. |
| 2008/0243796 | A1 | 10/2008 | Prahlad et al. |
| 2008/0249996 | A1 | 10/2008 | Prahlad et al. |
| 2008/0249999 | A1* | 10/2008 | Renders et al. .................... 707/4 |
| 2008/0263029 | A1* | 10/2008 | Guha et al. ......................... 707/5 |
| 2008/0294605 | A1 | 11/2008 | Prahlad et al. |
| 2009/0177728 | A1* | 7/2009 | Pottenger ...................... 709/201 |
| 2009/0287665 | A1 | 11/2009 | Prahlad et al. |

FOREIGN PATENT DOCUMENTS

| | | |
|---|---|---|
| EP | 0405926 | 1/1991 |
| EP | 0 467 546 | 1/1992 |
| EP | 0 774 715 | 5/1997 |
| EP | 0 809 184 | 11/1997 |
| EP | 0 899 662 | 3/1999 |
| EP | 0 981 090 | 2/2000 |
| EP | 1 174 795 | 1/2002 |
| WO | WO 95/13580 | 5/1995 |
| WO | WO 99/12098 | 3/1999 |
| WO | WO 99/14692 | 3/1999 |
| WO | WO 03/060774 | 7/2003 |
| WO | WO 2005/055093 | 6/2005 |
| WO | WO 2007/062254 | 5/2007 |
| WO | WO 2007/062429 | 5/2007 |
| WO | WO 2008/049023 | 4/2008 |

OTHER PUBLICATIONS

U.S. Appl. No. 11/564,119, filed Nov. 28, 2006, Prahlad et al.
U.S. Appl. No. 11/564,130, filed Nov. 28, 2006, Prahlad et al.
U.S. Appl. No. 11/564,136, filed Nov. 28, 2006, Prahlad et al.
U.S. Appl. No. 11/564,153, filed Nov. 28, 2006, Prahlad et al.
U.S. Appl. No. 11/564,163, filed Nov. 28, 2006, Prahlad et al.
U.S. Appl. No. 11/564,170, filed Nov. 28, 2006, Prahlad et al.
U.S. Appl. No. 11/564,174, filed Nov. 28, 2006, Prahlad et al.
U.S. Appl. No. 11/564,177, filed Nov. 28, 2006, Prahlad et al.
U.S. Appl. No. 11/564,180, filed Nov. 28, 2006, Prahlad et al.
U.S. Appl. No. 11/564,194, filed Nov. 28, 2006, Prahlad et al.
U.S. Appl. No. 11/564,197, filed Nov. 28, 2006, Prahlad et al.
U.S. Appl. No. 11/564,215, filed Nov. 28, 2006, Prahlad et al.
U.S. Appl. No. 11/564,220, filed Nov. 28, 2006, Prahlad et al.
U.S. Appl. No. 11/564,221, filed Nov. 28, 2006, Prahlad et al.
U.S. Appl. No. 11/564,233, filed Nov. 28, 2006, Prahlad et al.
U.S. Appl. No. 11/605,931, filed Nov. 28, 2006, Prahlad et al.
U.S. Appl. No. 11/605,932, filed Nov. 28, 2006, Prahlad et al.
U.S. Appl. No. 11/605,944, filed Nov. 28, 2006, Prahlad et al.
U.S. Appl. No. 11/931,034, filed Oct. 31, 2007, Kottomtharayil et al.
U.S. Appl. No. 12/058,487, filed Mar. 28, 2008, Prahlad.
U.S. Appl. No. 12/058,575, filed Mar. 28, 2008, Prahlad et al.
U.S. Appl. No. 12/058,589, filed Mar. 28, 2008, Prahlad et al.
U.S. Appl. No. 12/511,653, filed Jul. 29, 2009, Prahlad, et al.
U.S. Appl. No. 12/548,953, filed Aug. 27, 2009, Ahn et al.
U.S. Appl. No. 12/695,203, filed Jan. 28, 2010, Prahlad et al.
U.S. Appl. No. 12/695,289, filed Jan. 28, 2010, Prahlad et al.
"Text Figures," retrieved from http://www.microsoft.com/msj/1198.nffs/ntfstextfigs.htm on Nov. 10, 2005, 7 pages.
Armstead et al.; "Implementation of a Campus-wide Distributed Mass Storage Service: The Dream vs. Reality," IEEE, 1995, pp. 190-199.
Arneson, "Mass Storage Archiving in Network Environments" IEEE, 1998, pp. 45-50.
Arneson, Control Data Corporation, Development of Omniserver; Mass Storage Systems, 1990, pp. 88-93.
Cabrera, et al., "ADSM: A Multi-Platform, Scalable, Backup and Archive Mass Storage System," Digest of Papers, Compcon '95, Proceedings of the 40th IEEE Computer Society International Conference, Mar. 5-9, 1995, pp. 420-427, San Francisco, CA.
Communication with extended European Search Report for Application No. PCT/US2006/061304, dated Dec. 30, 2008.
Cooperstein, et al., "Keeping an Eye on Your NTFS Drives: The Windows 2000 Change Journal Explained," Sep. 1999, retrieved from http://www.microsoft.com/msj/0999/journal/journal.aspx on Nov. 10, 2005, 17 pages.
Eitel, "Backup and Storage Management in Distributed Heterogeneous Environments," IEEE, 1994, pp. 124-126.
EMC Corporation, "Today's Choices for Business Continuity," 2004, 12 pages.
Examination Report for European Application No. 06 844 595.6, Mail Date: Sep. 26, 2008, 5 pages.
http://en.wikipedia.org/wiki/Machine_learning, Jun. 1, 2010.
http://en.wikipedia.org/wiki/Naive_Bayes_classifier, Jun. 1, 2010.
Jander, M., "Launching Storage-Area Net," Data Communications, US, McGraw Hill, NY, vol. 27, No. 4 (Mar. 21, 1998), pp. 64-72.
Jason Gait, "The Optical File Cabinet: A Random-Access File system for Write-Once Optical Disks," IEEE Computer, vol. 21, No. 6, pp. 11-22 (1988) (see in particular figure 5 in p. 15 and the recitation in claim 5).
Langdon, et al., "Data Classification: Getting Started," Storage Magazine, Jul. 2005, retrieved from http://storagemagazine.techtarget.com/magPrintFriendly/0,293813,sid35_gci1104445,00.html; on Aug. 25, 2005, 3 pages.
Microsoft, "GetFileAttributes," updated Sep. 2005, retrieved from http://msdn.microsoft.com/library/en-us/fileio/fs/getfileattributes.asp?frame=true on Nov. 10, 2005, 3 pages.
Microsoft, "GetFileAttributesEx," updated Sep. 2005, retrieved from http://msdn.microsoft.com/library/en-us/fileio/fs/getfileattributesex.asp?frame=true on Nov. 10, 2005, 2 pages.
Microsoft, "WIN32_File_Attribute_Data," updated Sep. 2005, retrieved from http://msdn.microsoft.com/library/en-us/fileio/fs/win32_file_attribute_data_str.asp?frame on Nov. 10, 2005, 3 pages.
O'Neill, "New Tools to Classify Data," Storage Magazine, Aug. 2005, retrieved from http://storagemagazine.techtarget.com/magPrintFriendly/0,293813,sid35_gci1114703,00.html on Aug. 25, 2005, 4 pages.
Partial International Search Results, mailed May 25, 2007, International Application No. PCT/US2006/045556, 2 pages.
PCT International Search Report and Written Opinion for International Application No. PCT/US07/81681, Mail Date: Nov. 13, 2009, 8 pages.
Richter, et al., "A File System for the 21st Century: Previewing the Windows NT 5.0 Files System," Nov. 1998, retrieved from http://www.microsoft.com/msj/1198/ntfs/ntfs.aspx on Nov. 10, 2005, 17 pages.
Rosenblum, et al., "The Design and Implementation of a Log-Structure File System," Operating Systems Review SIGOPS, vol. 25, No. 5, New York, US, pp. 1-15 (May 1991).
Search Report for European Application No. 06 844 595.6, Mail Date: Sep. 26, 2008, 5 pages.
Witten, et al., "Data Mining, Practical Machine Learning Tools and Techniques", $2^{nd}$ Edition, 2005, part 1.

Witten, et al., "Data Mining, Practical Machine Learning Tools and Techniques", 2nd Edition, 2005, part 2.
Szor, "The Art of Computer Virus Research and Defense", 2005 Symantec Corporation, part 1.
Szor, "The Art of Computer Virus Research and Defense", 2005 Symantec Corporation, part 2.

* cited by examiner

SYSTEMS AND METHODS FOR PROBABILISTIC DATA CLASSIFICATION

BACKGROUND OF THE INVENTION

1. Field of the Invention

The field of the invention relates to systems and methods for performing data classification operations.

2. Description of the Related Art

As modern enterprise environments trend towards a paperless workplace, electronic data is often created at a high rate. This electronic data takes a variety of forms which may include emails, documents, spreadsheets, images, databases, etc. Businesses have a need to effectively classify and organize all of this electronic data.

However, it can be extremely difficult to accurately classify large amounts of data in ways which are time and cost effective. Existing solutions have typically allowed a user to classify files in at least one of two ways. The user can manually view each file and determine the appropriate classification. While this can be a relatively accurate method of categorizing data, it quickly becomes expensive and impractical as the volume of data-to-be-classified increases.

Alternatively, files can be classified using an explicit set of rules defined by the user. For example, a data classification rule may be based on inclusion of a keyword or a small set of keywords. With this approach, the classification of files can be done by machine, but the use of explicit rules tends to be a relatively inaccurate method of classifying non-homogeneous files and can result in many false classifications.

SUMMARY OF THE INVENTION

Therefore, there is a need for more accurate automated systems for classifying and organizing the large amounts of computer data which exist in modern enterprise environments.

One embodiment of the invention comprises a filesystem configured to store a plurality of computer files; a scanning agent configured to traverse the filesystem and compile data regarding the attributes and content of the plurality of computer files; an index configured to store the data regarding attributes and content of the plurality of computer files; and a file classifier configured to analyze the data regarding the attributes and content of the plurality of computer files and to classify the plurality of computer files into one or more categories based on the data regarding the attributes and content of the plurality of computer files.

Another embodiment of the invention comprises a method of traversing a filesystem and compiling data regarding attributes and content of a plurality of computer files stored in the filesystem; storing the data regarding attributes and content of the plurality of computer files in an index; analyzing the data regarding the attributes and content of the plurality of computer files; and classifying the plurality of computer files into one or more categories based on the data regarding the attributes and content of the plurality of computer files.

Another embodiment of the invention comprises means for traversing a filesystem and compiling data regarding attributes and content of a plurality of computer files stored in the filesystem; means for storing the data regarding attributes and content of the plurality of computer files in an index; means for analyzing the data regarding the attributes and content of the plurality of computer files; and means for classifying the plurality of computer files into one or more categories based on the data regarding the attributes and content of the plurality of computer files.

DETAILED DESCRIPTION OF THE PREFERRED EMBODIMENTS

Figure 1:
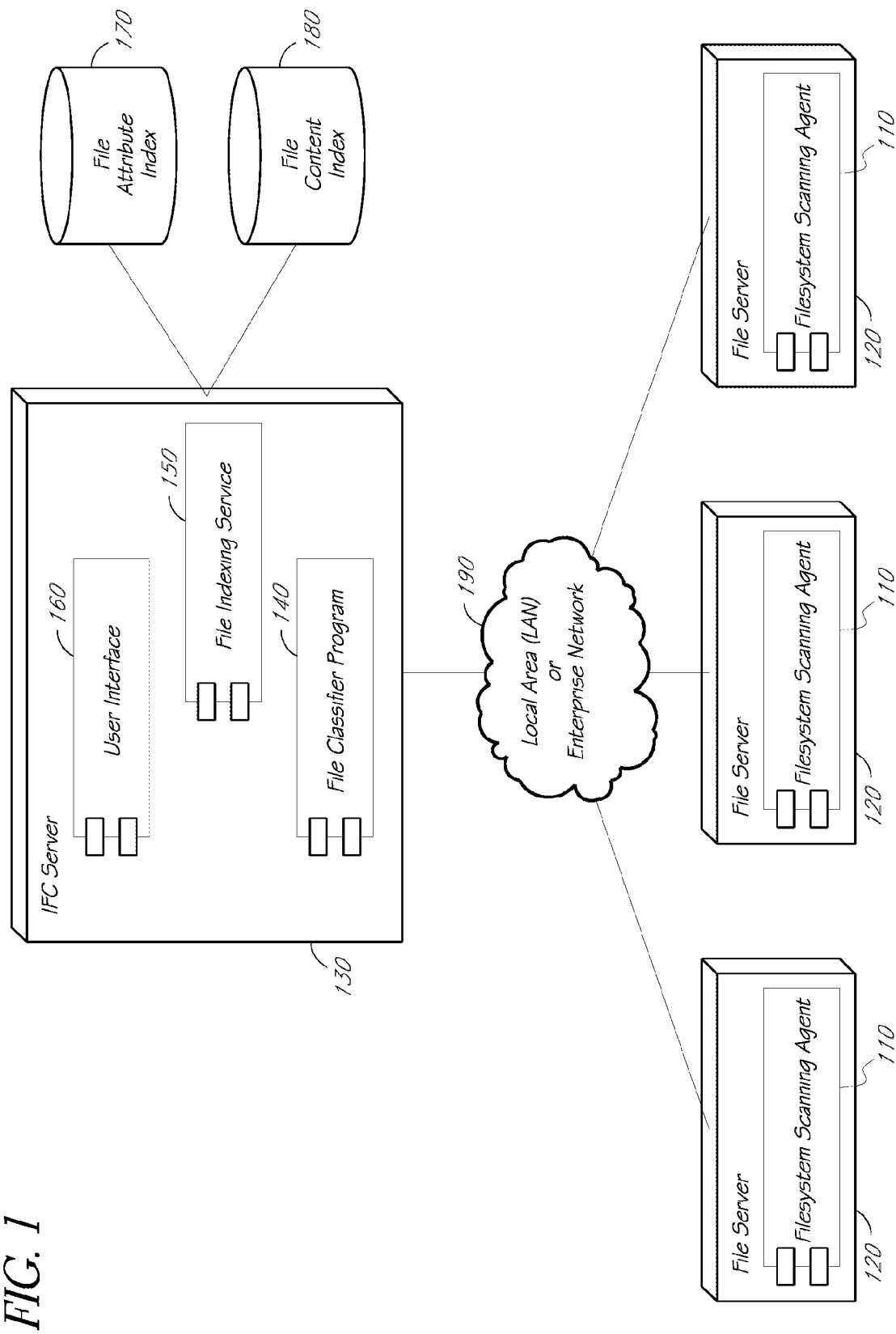
FIG. 1 is a schematic representation of a data classification system.

As discussed previously, there can be tradeoffs involved in performing electronic data classification. Electronic data classification can be performed manually with relatively good accuracy, but the process is slow and expensive. This type of process can be referred to as supervised classification. In other cases, data classification can be performed in an automated manner, but if done using explicit rules only, automated classification can result in relatively poor accuracy. This can be referred to as unsupervised classification. In still other cases, techniques can be used which result in semi-supervised classification.

Semi-supervised classification techniques may rely on some degree of human input to train a machine to recognize various categories of data. Once the machine has been trained, it can perform data classification operations independent of further human intervention. Semi-automated techniques of this sort can result in greater accuracy than more simplistic automated methods which rely solely on explicit rules. One example of a semi-supervised data classification technique of this sort is a Naïve Bayes classifier. Naïve Bayes classifiers have found use in certain email systems to help in rejecting unwanted, or "spam," messages as they arrive over a network at an email server, for example, but not to existing files stored in a computer system.

Apart from the filtering of incoming email messages, significant benefits can be had from applying the Naïve Bayes method, as well as other classification methods, to data that is already stored in a computer system. In particular, there are tremendous advantages to be had from applying data classification methods to large-scale computing systems with tremendous amounts of stored data. These advantages include, among others, using automated data classification methods classification to place proper security restrictions on access to certain files (this may be required by law in certain instances, such as in the case of medical records or private personnel information) or to control the location where a file is stored or backed up so that it can be located at a later date. Classification of data can also be useful in determining whether certain files should be deleted entirely, backed up in relatively fast access storage media, or permanently archived in slower access media.

Therefore, it would be advantageous to have an automated system, with improved accuracy, for carrying out file classification operations on the data stored in a business' computing system. In certain preferred embodiments of the invention, such an automated system would perform data classification on a substantial portion of a business' stored files on an enterprise-wide, cross-platform scope.

Just as there are many reasons to classify files, there are also many schemes of doing so. Generally speaking, the task of data classification is to assign electronic data to one or more categories based on content or characteristics of the data. In some cases, files may be grouped according to common characteristics such as file size or file extension. In other cases, files could be grouped with more sophisticated techniques according to subject matter. Many other classification schemes also exist and it should be understood that embodiments of the invention can be adapted to use a wide variety of classification schemes.

FIG. 1 is a schematic representation of an automated system for performing data classification on electronic files according to one embodiment of the invention. The file servers 120, which can include or be coupled to electronic data storage devices, handle I/O requests to a filesystem shared by a plurality of client computers (not shown) in a business' computing system. The client computers can be coupled to the file servers 120 via the Local Area Network (LAN) 190, or in any other way known in the art. In this way, the file servers 120 house a substantial portion of a business' electronic data, which is accessible to a plurality of client computers via the network 190.

In other embodiments, the shared data storage capacity could take a form other than shared file servers. For example, shared storage devices could be coupled to a plurality of client computers via a Storage Area Network (SAN) or a Network Attached Storage (NAS) unit. Other shared electronic data storage configurations are also possible.

In one embodiment, each file server 120 may include a filesystem scanning agent 110. The file system scanning agents 110 can systematically traverse data housed by a corresponding file server 120. The filesystem scanning agents 110 can access electronic files and compile information about the characteristics of the files, the content of the files, or any other attribute of interest that could serve as the basis for categorizing the electronic files. Filesystem classification agents 110 can be configured to operate with any type of filesystem.

Furthermore, while the filesystem scanning agents 110 are illustrated as modules operating within the file servers 120, in other embodiments the filesystem scanning agents 110 can be separate devices coupled to file servers 120 via a network 190. In still other embodiments, filesystem scanning agents 110 can be made capable of directly accessing data storage devices shared by a plurality of client computers over the network 190, such as via SAN networks or NAS units. The filesystem scanning agents can be implemented in any combination of hardware and software.

As filesystem scanning agents 110 compile information about file characteristics, content, etc., the information can be shared with a file indexing service 150 which can maintain databases, such as a file attribute index 170 and a file content index 180, to store the information. In some embodiments, the file attribute index 170 can be combined with the file content index 180, or the two indexes can be implemented as a number of sub-indexes. In one embodiment, the file indexing service 150 may be a module operating on an Intelligent File Classifier (IFC) server 130 and information can be exchanged between the filesystem scanning agents 110 and the file indexing service 150 via the network 190.

The IFC server 130 can include a data processor and electronic memory modules. The IFC server may also include a file classifier program 140 module which can access the file attribute 170 and the file content 180 indexes and classify electronic data files as members of various categories, according to the methods described below. The IFC server 130 may also include a user interface 160 to allow a user to input the characteristics or content of a category of interest and to view a listing of the designated member files of a data classification operation performed by the file classifier program 140. The user interface 160 may comprise any type of user interface known in the art, such as an I/O terminal coupled to the IFC server 130 or a web server to allow a user to remotely access the IFC server 130.

Figure 2:
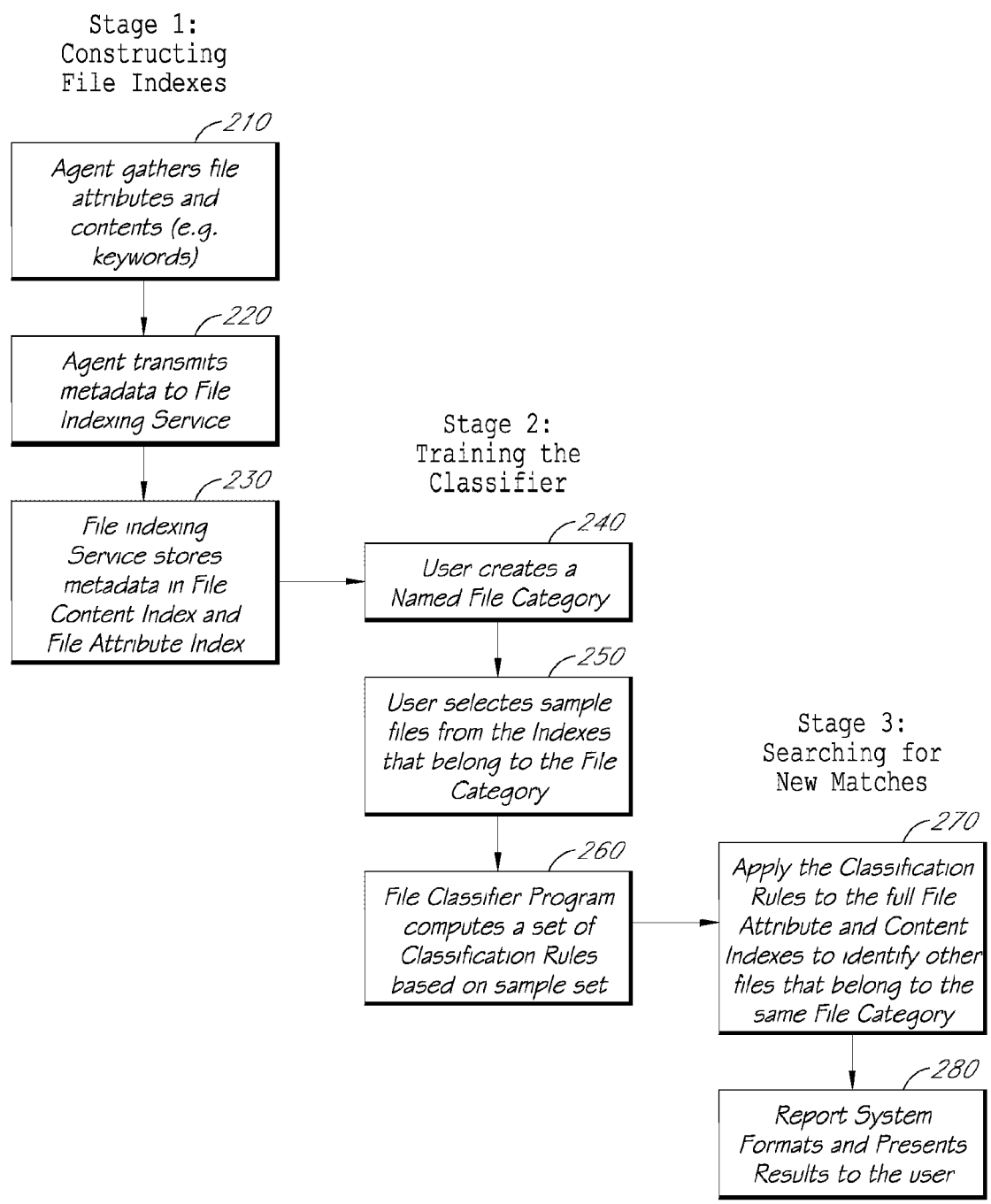
FIG. 2 is a flowchart for performing classification operations on data files.

FIG. 2 is a flowchart which represents an exemplary method of performing data classification operations using the system illustrated in FIG. 1. At block 210 a filesystem scanning agent 110 traverses a filesystem and compiles information regarding the attributes and content of electronic files stored in the filesystem. In some embodiments, the filesystem scanning agents 110 may have access to a database which indicates the date that a particular file's attributes and content were last gathered. In these embodiments, the filesystem scanning agents 110 may determine whether this date came after the last known modification to the file, in which case the filesystem scanning agent 110 may be configured to skip the current file and move on to the next available file.

In other embodiments, the filesystem scanning agents 110 may be notified any time a file is created or modified so that the new or modified file's attributes and contents can be compiled or updated. The filesystem scanning agents 110 may be notified of these events by filesystem drivers whenever a filesystem I/O request is made, by a packet sniffer coupled to a network which scans the contents of data packets transmitted over the network to determine when a file is created or modified, or using any other technique known in the art.

File attributes compiled by the filesystem scanning agents 110 may include, but are not limited to, the file name, its full directory path, size, type, dates of last modification and access, or other types of metadata. The file attribute information may be transmitted to a file indexing service 150 to be stored in a file attribute index 170. This index may take the form of a relational database which can be searched by any attribute entry or combination of attributes. In certain embodiments, the file attribute index 170 can be a centralized database managed by a file indexing service 150 which receives file attribute and content information from a plurality sources. The file attribute index 170 may also include information regarding the categories to which a particular file is presently marked as belonging to, or has been marked as having belonged to in the past.

The filesystem scanning agents 110 can also analyze data files to catalog their content. For example, if the file includes text, the filesystem scanning agents 110 may create a list of keywords found within the file as well as frequency counts for each of the keywords. If the file is not a text file but rather an image of a document, the classification element 312 may first perform an optical character recognition (OCR) operation before creating keyword lists and frequency counts. The file content information may be transmitted to a file indexing service 150 to be stored in a file content index 180. The file content index 180 may take the form of a searchable database which contains the keyword lists and frequency counts gathered by the filesystem scanning agents 110 as well as logical mappings of keywords to the files in which they are found. Much like the file attribute index 170, it may be advantageous for the file content index to be managed by a file indexing service 150 which receives file attribute and content information from a plurality of sources.

The file content index 180 may be searched by file, producing a list of keywords for the file. The file content index 180 may also be searched by keyword, producing a list of files which contain that word. This type of search result can include a relevance ranking which orders the list of files which contain the search term by the frequency with which they appear in the file. Other methods of cataloguing and searching the file content index 180 can also be used.

Other types of files besides text-containing documents can be analyzed for content as well. For example, digital image processing techniques can be used to scan image files for certain image features using object recognition algorithms to create a catalogue of features that are identified. Similarly, audio files could be scanned to catalogue recognizable features. In fact, the filesystem scanning agents 110 can be used to analyze any file type for any type of content to the extent that there exists a method for performing such analysis. In any case, a catalogue of the identified file content can be kept in the file content index 180.

At block 220, a filesystem scanning agent 110 transmits file attribute and content information to the file indexing service 150. At block 230, the file indexing service 150 stores that information in the appropriate index. Files stored by the file servers 120 can classified, or designated as members of a defined category, based on the information in these indexes. The classification of a file can be based on information from the file attribute index 170, the file content index 180, or some combination of both.

As described above, some classification techniques are semi-supervised in that they rely on some degree of human input to train a machine to recognize various categories of data before. Once the machine has been trained, it can perform data classification operations substantially independent of further human intervention. Blocks 240, 250, and 260 represent an embodiment of a method for training an automated data classification system which employs semi-supervised classification techniques. Embodiments of the invention will be described below primarily in terms of a Naïve Bayes classification algorithm, however neural networks or strict Bayesian networks are also suitable candidates. Other types of classifiers or algorithms can also be used.

For example, it should be understood that fully supervised and fully unsupervised classification techniques can be advantageously used in certain embodiments of the invention. One embodiment of the invention may use a set of explicit user-defined rules to decrease the number of files to which a more computationally expensive classification method is then applied. For example, a user may wish to identify only recent files belonging to a particular category. In such a case, an explicit rule requiring a file to have been modified no longer than thirty days previously could be used to decrease the number of candidate files to be analyzed using a Naïve Bayes algorithm, which uses a more computationally complex calculation to determine a probability that a particular file belongs to the desired category.

At block 240, a user creates a name for a particular category of data, members of which he or she would like to locate amongst the mass of data stored in file servers 120 or some other type of shared storage device accessible to a plurality of client computers. This can be done with the user interface 160 of the IFC server. At block 250, the user can select sample files from the file attribute 170 and file content 180 indexes which are properly designated as members of the category of data which the user wishes to identify. These sample files can constitute a training set of data which allows the file classifier program 140 to "learn" how to identify files stored by the file servers 120 which are members of the desired category. Using this training set of data, the file classifier program 140 computes, at block 260, a set of classification rules that can be applied to the files from the file attribute 170 and file content 180 indexes which were not included in the training set.

At block 270, the set of test data is used to calculate a probability that a file belongs to the desired category. This can be done for each file indexed by the indexing service 150 that lies outside the training set selected by the user. Finally, at block 280, the user interface 160 can format the results of the classification operation and present the results to the user. For example, the user interface 160 can present a list of each file which was determined by the file classifier program 140 to belong to a desired category.

Some classification techniques, such as a Naïve Bayes algorithm, may output a probability that a given unclassified file should be marked as belonging to a certain category. In these embodiments, the determination that a file belongs to a particular category may be based on the calculated probability of the file belonging to the category exceeding a threshold. A determination can be made whether the probability is high enough to risk a mistaken classification and justify classifying the file as a member of the category in question. In such cases, the file classifier program 140 may be configured to mark the file as a member of the category if the probability exceeds a user-defined threshold.

For example, a user might configure the classification element to mark a file as a member of a category only if the calculated probability is greater than 85%. In cases where the accuracy of the classification operation is critical and where the calculated probability falls short of the threshold by a relatively small margin, the file classifier program may be configured to mark the file as being a questionable member of the category and allow a user to view the file to determine whether it should or should not be designated as a member of the category in question.

Once the file has been classified, it may be labeled as a member of the designated category in the file attribute index. A file may be classified as a member of more than one category. In some embodiments, a category of files may be defined temporarily by a user query. In other embodiments, a category of files can be defined on a relatively permanent basis and new files which meet the criteria of the category previously calculated by the file classifier program 140 on the basis of a training set of data can be automatically added to the category as they are created or modified.

A specific example of a Naïve Bayes classifier, according to one embodiment of the invention, will now be given based on the training data in the following chart.

| File Name | File Size < 1 KB? | Contains Keyword "SSN"? | Belongs to "Personnel Records" Category? |
|---|---|---|---|
| Foo.doc | Yes | Yes | Yes |
| Bar.doc | No | Yes | Yes |
| Bas.doc | Yes | No | No |
| Qux.doc | Yes | No | No |
| Quux.doc | No | Yes | Yes |

In the above training set of data, five files have been marked by a user as belonging, or not belonging, to a category called "Personnel Records." The training data includes both members (Foo.doc, Bar.doc, and Quux.doc) of the desired category, as well as non-members (Bas.doc and Qux.doc). In this example, the data on whether each of the files in the training set is smaller than 1 KB can be obtained from the file attribute index 170. The data on whether each file contains the keyword "SSN" can be obtained from the file content index 180.

Based on this information, the file classifier program 140 can calculate a probability that files smaller than 1 KB are members of the "Personnel Records" category. Based on the above training data, one out of three files which are smaller than 1 KB are also members of the "Personnel Records" category, for a probability of 33%. The file classifier program 140 can also calculate a probability that files which contain the keyword "SSN" are members of the "Personnel Records" category. Three out of three files which contain the keyword "SSN" are also members of the "Personnel Records" category. This leads to a calculated probability of 100% that a file belongs to the "Personnel Records" category if it contains the keyword "SSN."

An overall probability that a file belongs to the desired category can also be calculated from the training set of data. In this case, three out of the five files in the training set are members of the "Personnel Records" category for an overall probability of membership of 60%. Using these probabilities, the file classifier program can analyze whether files outside the training set are smaller than 1 KB or contain the keyword "SSN," and then determine the probability that the file belongs to the "Personnel Records" category using Bayes Theorem, or similar method.

In general, the larger the training set of data and the more representative it is of a cross-section of files in the filesystem in terms of attributes, content, and membership in the desired category, the more accurate will be the results obtained from the classification operation performed by the file classifier program 140 when using a Naïve Bayes algorithm. However, other characteristics of a training set of data can be emphasized in embodiments of the invention which use other classification algorithms.

Once the file classifier program 140 has finished classifying a file, some course of action may be taken by the IFC server 130 based on the outcome of the file classification operation. In some cases the course of action may be pre-determined and user-defined. In this type of embodiment, IFC server 130 may include a database that contains a list of classification outcomes, such as "File Classified as Personnel Information," as well as a corresponding action to be performed when the associated classification outcome occurs. In other embodiments, the IFC server 130 may include learning algorithms to independently determine what course of action to take after a classification operation is completed based on its past experience or based on a set of training data that has been provided to guide its actions.

One action that could be taken by the IFC server 130 based on a file classification outcome is changing access permissions on a file based on the sensitivity of the category to which it belongs. It may be desirable to limit access of the file to certain users of the host computing system for any number of reasons: the file may contain sensitive personal employee information, trade secrets, confidential financial information, etc.

Another action that could be taken by the IFC server 130 based on a file classification outcome is to change the backup or archive schedule for the file. Certain categories of files may be classified as non-critical. It may be preferable to backup these types of files less regularly in order to conserve system resources. In addition, these files may be migrated to slower access storage sooner than would be the case for more important files, or possibly never. Other categories of files may be classified as critical data. As such, it will likely be desirable to regularly backup these files and possibly maintain them in fast access memory for an extended period of time.

In addition, it would be possible to carefully create and manage a schedule for permanently archiving these files due to the critical information they contain. In embodiments of the invention where the results of a data classification operation are used to influence how certain categories of information are backed up or archived, it may be beneficial to integrate a data classification system, such as the one illustrated in FIG. 1, with a data storage and backup system. Many different types of data storage and backup systems can be used for this purpose. However, an exemplary data storage and backup system which can be modified to include a data classification system is illustrated in FIG. 3.

Figure 3:
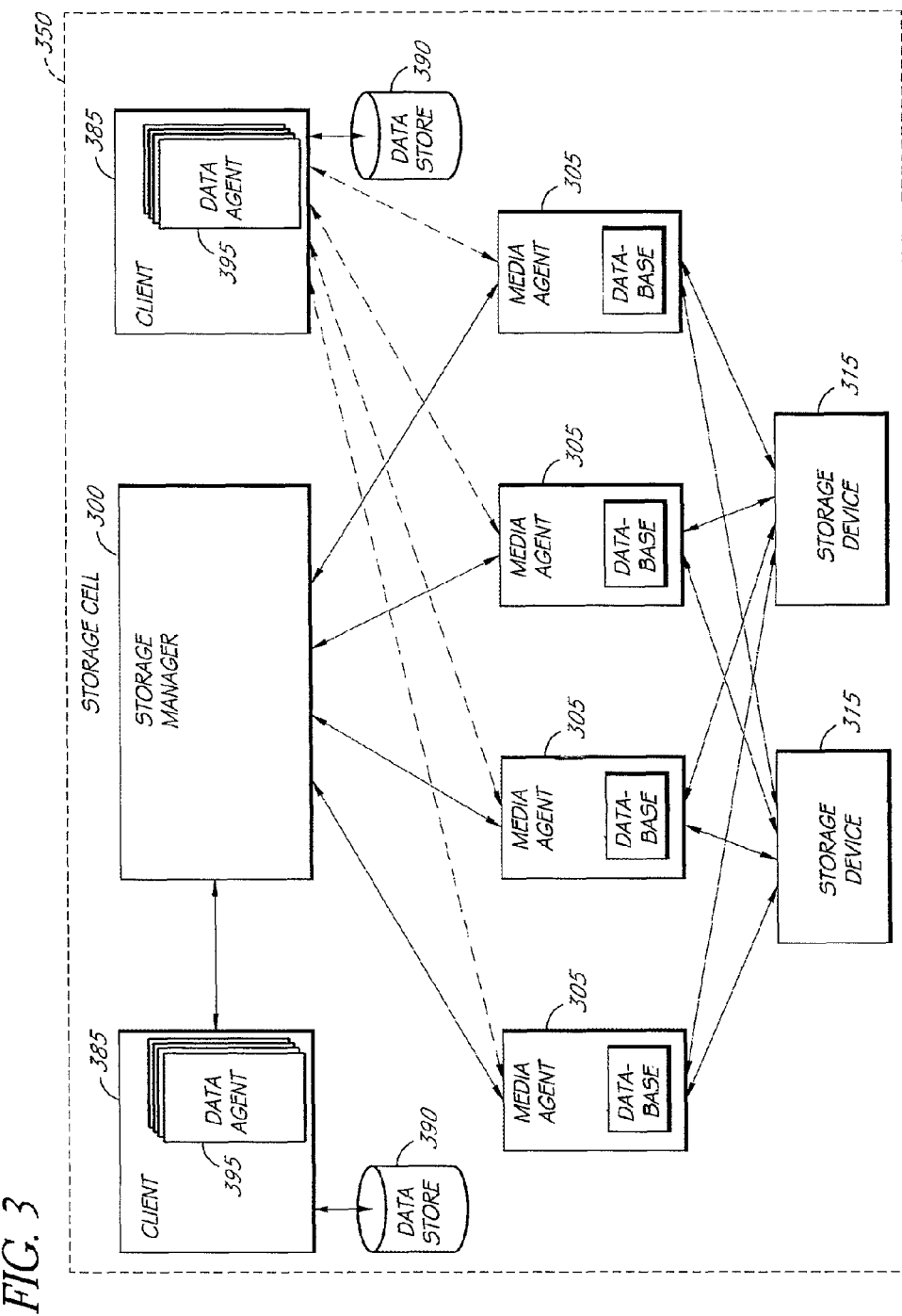
FIG. 3 is a schematic illustration of an embodiment of a data storage system for performing data storage operations for one or more client computers into which may be integrated a data classification system.

FIG. 3 illustrates a storage cell building block of a modular data storage and backup system. A storage cell 350 of a data storage system performs storage operations on electronic data for one or more client computers in a networked computing environment. The storage system may comprise a Storage Area Network (SAN), a Network Attached Storage (NAS) system, a combination of the two, or any other storage system at least partially attached to a host computing system and/or storage device by a network. Besides operations that are directly related to storing electronic data, the phrase "storage operation" is intended to also convey any other ancillary operation which may be advantageously performed on data that is stored for later access.

Storage cells of this type can be combined and programmed to function together in many different configurations to suit the particular data storage needs of a given set of users. Each storage cell 350 may participate in various storage-related functions, such as backup, data migration, quick data recovery, etc. In this way storage cells can be used as modular building blocks to create scalable data storage and backup systems which can grow or shrink in storage-related functionality and capacity as a business' needs dictate. This type of system is exemplary of the CommVault QiNetix system, and also the CommVault GALAXY backup system, available from CommVault Systems, Inc. of Oceanport, N.J. Similar systems are further described in U.S. patent application Ser. Nos. 09/610,738 AND 11/120,619, which are hereby incorporated by reference in their entirety.

As shown, the storage cell 350 may generally comprise a storage manager 300 to direct various aspects of data storage operations and to coordinate such operations with other storage cells. The storage cell 350 may also comprise a data agent 395 to control storage and backup operations for a client computer 385 and a media agent 305 to interface with a physical storage device 315. Each of these components may be implemented solely as computer hardware or as software operating on computer hardware.

Generally speaking, the storage manager 300 may be a software module or other application that coordinates and controls storage operations performed by the storage operation cell 350. The storage manager 300 may communicate with some or all elements of the storage operation cell 350 including client computers 385, data agents 395, media agents 305, and storage devices 315, to initiate and manage system backups, migrations, and data recovery. If the storage cell 350 is simply one cell out of a number of storage cells which have been combined to create a larger data storage and backup system, then the storage manager 300 may also communicate with other storage cells to coordinate data storage and backup operations in the system as a whole.

In one embodiment, the data agent 395 is a software module or part of a software module that is generally responsible for archiving, migrating, and recovering data from a client computer 385 stored in an information store 390 or other memory location. Each client computer 385 may have at least one data agent 395 and the system can support multiple client computers 385. In some embodiments, data agents 395 may be distributed between a client 385 and the storage manager 300 (and any other intermediate components (not shown)) or may be deployed from a remote location or its functions approximated by a remote process that performs some or all of the functions of data agent 395.

Embodiments of the storage cell 350 may employ multiple data agents 395 each of which may backup, migrate, and recover data associated with a different application. For example, different individual data agents 395 may be designed to handle Microsoft Exchange data, Lotus Notes data, Microsoft Windows file system data, Microsoft Active Directory Objects data, and other types of data known in the art. Other embodiments may employ one or more generic data agents 395 that can handle and process multiple data types rather than using the specialized data agents described above.

Generally speaking, a media agent 305 may be implemented as software module that conveys data, as directed by a storage manager 300, between a client computer 385 and one or more storage devices 315 such as a tape library, a magnetic media storage device, an optical media storage device, or any other suitable storage device. The media agent 305 controls the actual physical level data storage or retrieval to and from a storage device 315. Media agents 305 may communicate with a storage device 315 via a suitable communications path such as a SCSI or fiber channel communications link. In some embodiments, the storage device 315 may be communicatively coupled to a data agent 305 via a SAN or NAS system, or a combination of the two.

It should be appreciated that any given storage cell in a modular data storage and backup system, such as the one described, may comprise different combinations of hardware and software components besides the particular configuration illustrated in FIG. 3. Furthermore, in some embodiments, certain components may reside and execute on the same computer. A storage cell may also be adapted to include extra hardware and software for performing additional tasks in the context of a data storage and backup system. In particular, storage operation cells may include hardware and software for performing file classification operations. In particular, the storage cell 350 may be modified to include a filesystem scanning agent 110 and an IFC server 130.

The IFC server 130 may comprise a file classifier program 140, a file indexing service 150, and a user interface 160. Each of these components may function substantially in accordance with the description of these components set forth above with reference to FIGS. 1 and 2. However, certain modification to these components may be dictated by the configuration of the computing system into which they are being incorporated. In these instances it is within the ability of one of ordinary skill in the art to make these adaptations.

Preferred embodiments of the claimed inventions have been described in connection with the accompanying drawings. While only a few preferred embodiments have been explicitly described, other embodiments will become apparent to those of ordinary skill in the art of the claimed inventions based on this disclosure. Therefore, the scope of the disclosed inventions is intended to be defined by reference to the appended claims and not simply with regard to the explicitly described embodiments of the inventions.

What is claimed is:

1. A computer system comprising:
a filesystem configured to store a plurality of computer files in a computer memory;
a plurality of scanning agents implemented on one or more computer processors, wherein the plurality of scanning agents are configured to traverse the filesystem and compile attributes and content indexes about the plurality of computer files wherein the attributes and content indexes are stored in one or more databases that are stored separately from the filesystem; and
a file classifier comprising one or more computer processors, wherein the file classifier is configured to receive user input wherein the user selects a first set of attributes and content indexes from the one or more databases stored separately from a corresponding first set of computer files in the filesystem,
wherein the file classifier is configured to analyze the user input to determine a set of classification rules such that the classification rules are derived from accessing the first set of the attributes and content indexes in the one or more databases stored separately from the corresponding first set of computer files stored in the filesystem, wherein the set of classification rules are derived without directly accessing the first set of computer files stored in the filesystem,
wherein the file classifier is further configured to classify a second set of computer files stored in the filesystem without accessing the filesystem based on a calculated probability derived from a corresponding second set of attributes and context indexes in the one or more databases stored separately from the filesystem.

2. The system of claim 1, wherein the filesystem comprises one or more data storage devices coupled to a plurality of client computers via a Storage Area Network (SAN), a Network Attached Storage (NAS) unit, or some combination of the two.

3. The system of claim 1, further comprising an index configured to store metadata regarding the plurality of computer files.

4. The system of claim 3, wherein the metadata comprises a file size, name, path, type, or date of creation or modification.

5. The system of claim 3, wherein the metadata comprises information regarding a category that a file has been identified as being a member of.

6. The system of claim 3, wherein the content indexes comprise at least a file content index configured to store information regarding the content of the plurality of computer files.

7. The system of claim 6, wherein the content indexes comprise at least a keyword present in a computer file.

8. The system of claim 1, wherein the file classifier is configured to be trained to recognize files belonging to a category based on a user-provided training data set.

9. The system of claim 8, wherein the file classifier determines that a file should be classified as a member of a category based on a probability threshold.

10. The system of claim 9, wherein a computer file is classified as a member of a category only if the probability that it should be classified as a member of the category exceeds a user-defined threshold.

11. The system of claim 1, wherein the file classifier uses at least one of the group consisting of a Naïve Bayesian and a strict Bayesian algorithm.

12. The system of claim 1, wherein the file classifier is configured reduce a field of possible candidate member computer files of a category based on an explicit rule prior to applying a more computationally expensive classification algorithm to identify member computer files of the category.

13. The system of claim 1, wherein the system is configured to alter security access restrictions on a file based upon a category into which the file is classified.

14. The system of claim 1, wherein the system is configured to alter a data backup schedule for a file based upon a category into which the file is classified.

15. The system of claim 1, wherein the system is configured to alter a data migration plan for a file based upon a category into which the file is classified.

16. A method comprising:
- traversing a filesystem and compiling data regarding attributes and content indexes about a plurality of computer files stored in the filesystem, wherein the attributes and content indexes are stored in one or more databases that are stored separately from the filesystem;
- receiving user input wherein the user selects a first set of attributes and content indexes from the one or more databases stored separately from a corresponding first set of computer files in the filesystem;
- analyzing the user input and data regarding the first set of attributes and content indexes about the corresponding first set of computer files stored in the filesystem to derive a set of classification rules from the first set of attributes and content indexes stored separately from the corresponding first set of the corresponding first set of computer files without directly accessing the first set of computer files stored in the filesystem; and
- classifying a second set of computer files stored in the filesystem without accessing the filesystem into one or more categories based on a calculated probability derived from a corresponding second set of attributes and context indexes in the one or more databases stored separately from the filesystem.

17. The method of claim 16, further comprising training a file classifier to recognize files belonging to a category based on a user-provided training data set.

18. The method of claim 16, further comprising comparing the calculated probability with a predefined threshold to determine whether a file should be classified as a member of a category.

19. The method of claim 18, wherein a computer file is classified as a member of a category only if the probability that it should be classified as a member of the category exceeds a user-defined threshold.

20. The method of claim 16, further comprising altering a data backup schedule for a file based upon a category into which the file is classified.

21. The method of claim 16, further comprising altering a data migration plan for a file based upon a category into which the file is classified.

22. A computer system comprising:
- means for traversing a filesystem and compiling data regarding attributes and content indexes about a plurality of computer files stored in the filesystem in computer memory, wherein the attributes and content indexes are stored in one or more databases that are stored separately from the filesystem, and wherein the means for traversing the filesystem comprises one or more computer processors;
- means for receiving user input wherein the user selects a first set of attributes and content indexes from the one or more databases stored separately from a corresponding first set of computer files in the filesystem;
- means for analyzing the user input and data regarding the first set of attributes and content indexes about the corresponding first set of computer files stored in the filesystem to derive a set of classification rules from the first set of attributes and content indexes stored separately from the corresponding first set of computer files without directly accessing the first set of computer files stored in the filesystem; and
- means for classifying a second set of computer files stored in the filesystem without accessing the filesystem into one or more categories based on a calculated probability derived from a corresponding second set of attributes and context indexes in the one or more databases stored separately from the filesystem.

23. The system of claim 22, wherein the means for classifying comprises a Naïve Bayes classifier.

* * * * *

UNITED STATES PATENT AND TRADEMARK OFFICE
CERTIFICATE OF CORRECTION

| | |
|---|---|
| PATENT NO. | : 8,296,301 B2 |
| APPLICATION NO. | : 12/022676 |
| DATED | : October 23, 2012 |
| INVENTOR(S) | : Lunde et al. |

It is certified that error appears in the above-identified patent and that said Letters Patent is hereby corrected as shown below:

On the Title Page

In column 2 (page 3 item 56) at line 8, Under Other Publications, change "nffs" to --ntfs--.

In the Drawings

Sheet 2 of 3 (Referral No. 250, FIG. 2) at line 1, Change "selectes" to --selected--.

In the Claims

In column 10 at line 21, In Claim 1, change "context" to --content--.

In column 11 at line 26, In Claim 16, change "context" to --content--.

In column 12 at line 32, In Claim 22, change "context" to --content--.

Signed and Sealed this
Twenty-fifth Day of June, 2013

Teresa Stanek Rea
*Acting Director of the United States Patent and Trademark Office*